United States Patent [19]

Lynum et al.

[11] Patent Number: 5,527,518
[45] Date of Patent: Jun. 18, 1996

[54] PRODUCTION OF CARBON BLACK

[75] Inventors: Steinar Lynum, Oslo; Ketil Hox; Jan Hugdahl, both of Trondheim, all of Norway

[73] Assignee: Kvaerner Engineering a.s, Lysaker, Norway

[21] Appl. No.: 313,301

[22] PCT Filed: Apr. 5, 1993

[86] PCT No.: PCT/NO93/00058

§ 371 Date: Dec. 22, 1994

§ 102(e) Date: Dec. 22, 1994

[87] PCT Pub. No.: WO93/20154

PCT Pub. Date: Oct. 14, 1993

[30] Foreign Application Priority Data

Apr. 7, 1992 [NO] Norway .................. 92 1358

[51] Int. Cl.$^6$ ...................... C09C 1/48
[52] U.S. Cl. ................ 423/449.1; 423/458
[58] Field of Search .............. 423/449.1, 458

[56] References Cited

U.S. PATENT DOCUMENTS

| | | | |
|---|---|---|---|
| 1,392,266 | 9/1921 | Szarvasy | 423/458 |
| 3,342,554 | 9/1967 | Jordan et al. | 423/449.1 |
| 3,409,403 | 11/1968 | Bjornson et al. | 423/449.1 |
| 4,101,639 | 7/1978 | Surovikin et al. | 423/449.1 |

FOREIGN PATENT DOCUMENTS

| | | |
|---|---|---|
| 0050681 | 5/1982 | European Pat. Off. . |
| 292920 | 3/1990 | Germany . |
| 61-283635 | 12/1986 | Japan .................. 423/449.1 |
| 1400266 | 7/1975 | United Kingdom . |
| 1492346 | 11/1977 | United Kingdom . |

OTHER PUBLICATIONS

Kirk–Othmer, Blood, Coagulants and Anticoagulants to Cardiovascular Agents, Encyclopedia of Chemical Technology, Third Edtion, vol. 4, pp. 558 and 664 Nov. 1979.

*Primary Examiner*—Michael Lewis
*Assistant Examiner*—Stuart L. Hendrickson
*Attorney, Agent, or Firm*—Cushman Darby & Cushman

[57] ABSTRACT

For producing carbon black material having a surface area of less than 5 m$^2$/g, a dibutyl phthalate absorption of less than 30 ml/100 g and density compressed to 1.5–1.7 g/cm$^3$ and a specific electrical resistance of less than 0.1 ohmcm for use as an anode material for aluminum production, a method includes a first stage delivering feedstock through a feed tube to a plasma torch to a reaction area to raise the temperature of the feedstock to about 1600° C., then passing the dehydrogenated carbon material to a second stage to complete the decomposition to carbon black and hydrogen; adding additional raw material to cause quenching and reaction with formed carbon black to increase particle size density and quantity produced.

4 Claims, No Drawings

PRODUCTION OF CARBON BLACK

FIELD OF THE INVENTION

The invention relates to the production of carbon black in a pure form based on natural gas or methane.

BACKGROUND OF THE INVENTION

Decomposition of hydrocarbons for the production of carbon black is a well known process and there are a number of methods in existence for this purpose. The production of carbon black on the basis of methane is also described in Norwegian patent application No. 91 4904 by the same applicant. In the method which is described in this application, it has been shown that it is possible to decompose hydrocarbons in such a way that the physical properties of the carbon black to a great extent can be predetermined on the basis of given process parameters.

This has proved to be an extremely valuable possibility which can open the way for wider areas of application and for the achievement of better quality for products in which carbon black is already in use as the basic material.

From GB 1 492 346, GB 1 400 266 and DD 292 920 are known methods and processes for the production of carbon black by the pyrolytic decomposition of a hydrocarbon stock in a plasma reactor. The produced carbon black may be used in the rubber, electrical, paint and printing industries. However, the use is only directed to a general application of carbon black, and the application of a specific quality in order to obtain special properties for products is not disclosed.

There has been a need to find new applications for carbon black and especially for pure carbon black produced on the basis of natural gas, since the natural gas resources which have been established are very substantial. Methane is a hydrocarbon gas which exists in large quantities, is reasonably priced and has been shown to be well suited as a stock material for the production of pure carbon black and hydrogen. It seems that insufficient attention has been paid to the possibility and the significance of the use of pure carbon black as the basic material for final products.

SUMMARY OF THE INVENTION

Thus the object of the present invention is to provide new methods for the application of pure carbon black. A further object of the invention is to provide opportunities for the application of these materials in the form of basic materials which are both financially favourable and also afford improved quality.

These objects are achieved by the application of pure carbon black which is produced by the decomposition of natural gas or methane into their basic elements for the production of admixtures for the rubber industry, as pigments and printer's ink, for battery production, as a reduction material in the metallurgical industry, as an anode material in aluminium production, a carburizing material for the steel industry, activated charcoal, etc.

The surprising fact has been demonstrated that on the basis of natural gas or methane which are decomposed into their basic elements, viz. carbon black and hydrogen, carbonaceous materials in particular can be obtained in which the properties of the carbon, i.e. its specific weight, particle size, surface, characteristics, porosity and structure can be preset before production in such a manner that the end product obtained is specially suited to the particular above-mentioned purposes. The use of natural gas as a starting material provides a reasonably priced carbon black with special properties for special purposes and it has been shown that by means of the special application according to the invention, electrodes, admixtures, etc. are obtained with particularly favourable properties, as, e.g., in the aluminium industry or in the metallurgical industry, and a far more pollution-free production process is obtained. In the production of activated charcoal it has been shown that by means of the invention a material can be obtained with substantially better adsorption properties than with the activated charcoal used hereto, based on traditional raw materials such as wood, pit coal, lignite, peat, coconut shells, etc. In this process it is also possible to control the activated charcoal's adsorption properties by varying the surface pore size.

The application possibilities which have emerged as a result of the invention have proved to be very surprising. By using the indicated starting products, natural gas or methane, and exploiting the possibilities provided by this special starting material, with the possibilities which have emerged for adjusting the physical properties of the carbon formed, the surprising result has been obtained that the application for the said purposes has provided a marked improvement in the final product and has given the final producer considerably greater scope for obtaining special product qualities. In the rubber industry, e.g., the application of carbon black according to the invention has made it possible to produce rubber qualities with exceptional elasticity and rebound resilience. For activated charcoal, qualities can be provided whose absorption capacity is perfectly adapted to the purpose. As an electrode material the invention makes it possible to produce exceptionally pure electrodes at a reasonable cost, thus largely avoiding pollution from foreign materials.

In a further advantageous embodiment of the invention it will also be possible in the case of the special applications to use admixtures which may be favourable in the particular context. Thus the invention provides a number of new product possibilities in the indicated area where polluted carbon can be replaced with a completely pure carbon with corresponding or better properties.

In modifying the reactor atmosphere, i.e. admixture of e.g. an oxidizing medium such as $O_2$, air, $H_2O$, $CO_2$ or other medium, the carbon's physical properties such as BET, DBP, pH and particle form are controlled both individually and mutually to achieve the required value.

DETAILED DESCRIPTION OF THE INVENTION

The invention will now be described in more detail by means of some examples of the application.

Example 1

In the application of carbon black produced by means of decomposition of methane, the carbon quality was selected and adjusted during the production process for use in the production of rubber for car tires and for technical rubber. The selected values are presented in the following table.

RUBBER

| | BET m²/g | DBP) ml/100 g | ASTM classification |
|---|---|---|---|
| Car tires | 20–200 | 65–200 | N110–N660 |
| Tech. rubber | 5–80 | 40–150 | N550–N990 |

BET: "Brunauer, Emmet & Telfer" method.
DBP: ASTM D-2414 "Carbon Black Dibuthyl Phtalate Absorption".
Classification: ASTM D-1765 "Carbon Black used in rubber products".

The carbon black covers the entire quality range for the rubber industry.

Example 2

A pure carbon produced from methane is used as pigment/printer's ink after having been provided with the following physical properties.

PIGMENT/PRINTER'S INK

| BET m²/g | DBP ml/100 g | Tint strength % | pH |
|---|---|---|---|
| 20–N500 | 30–150 | 20–130 | 3–9 |

Tint strength: ASTM D-3265 "Test Method for Carbon Black—Tint Strength".

Covers the entire quality range.

Example 3

The carbon black according to the invention was used for the production of electrodes in dry cell batteries with the following quality specification.

ELECTRODES FOR DRY CELL BATTERY

| BET m²/g | AS ml/5 g | Spec. el. resistance ohm cm |
|---|---|---|
| 40–80 | 20–50 | <0.1 (200 bar) |

AS: "Adsorption rigidity", i.e. admixture of acetone solution necessary in order to be able to shake the powder into a ball (ml/5 g powder), method "Knapsack".

Covers the quality "Acetylene Black".

Example 4

The carbon black was used according to the invention with the following quality characteristics.

REDUCTION MATERIAL FOR THE METALLURGICAL INDUSTRY

| BET m²/g | DBP (ml/100 g) | Spec. el. resistance ohm cm | Reactivity (ml SiO) |
|---|---|---|---|
| 5–30 | 30–200 | <0.1 | 250–1000 |

Reactivity: J. Kr. Tuset and O. Raaness: "Reactivity of Reduction Materials in the Production of Silicon, Silicon-rich Ferro Alloys and Silicon-Carbide". AIME El. Furnace Conf., St. Louis, Mo. Dec. 7–10, 1976.

Modification of the particle structure is necessary. Carbon particles with a crystalline form and good conductivity are used.

The carbon black has to undergo a finishing treatment by the admixture of a binding agent of the molasses type, bitumens and alternative resins in order to achieve high strength at a high temperature to enable it to be produced in the required product form (briquette/agglomerate with an "open structure").

Necessary properties in the product:

Reactivity: High degree of reactivity, i.e. open structure. <1000 ml/SiO (Sintef method).

Mechanical strength: "Great" should be capable of withstanding load in furnace charge at high temperature without clogging.

Example 5

Application as anode material for aluminium production.

ANODE MATERIAL FOR ALUMINIUM PRODUCTION

| BET m²/g | DBP ml/100 g | Spec. weight compressed g/cm³ | Spec. el. resistance ohm cm |
|---|---|---|---|
| <5 | <30 | 1.5–1.7 | <0.1 |

Requirements for the carbon black:

"No" structure, i.e. quality "heavier" than N-990.

High degree of graphitization provides carbon particles with crystalline form/good conductivity.

Little reactivity (little open porosity).

Carbon black with binding agent is given a finishing treatment to produce the correct product form ("coke", briquette, agglomerate with "dense" structure).

Requirements for produced anode material:

Density: 1.5–1.6 g/cm³

Spec. el. conductivity: 30–60 ohm m

Compressive strength: approximately 45 MPa

Tot. porosity: approximately 30%

Example 6

CARBURIZING MATERIAL FOR THE STEEL INDUSTRY

| BET m²/g | DBP ml/100 g | Spec. el. resistance ohm cm | H ppm |
|---|---|---|---|
| 5–30 | 30–200 | <0.1 | <200 |

Requirements for the carbon black:

The carbon black must be "reactive", i.e. in this connection suitable for rapid dissolution in the material as C-atoms.

The proportion of hydrogen must be low, otherwise hydrogen "blisters" are formed.

Example 7

ACTIVATED CHARCOAL

| BET<br>m²/g | DBP<br>ml/100 g |
|---|---|
| 5–50 | 30–200 |

The carbon black with binding agent is given a finishing treatment to produce the required product form (agglomerate/extruded form) with subsequent activation.

Requirements for activated charcoal:

| BET<br>m²/g | Pore dia.<br>Å |
|---|---|
| 500–1500 | 10–100* |

*depending on the application (i.e. type of molecule to be adsorbed).

According to one embodiment, a preheated fee stock of methane and/or natural gas is passed through a plasma torch where the plasma gas is preferably recycled hydrogen which will cause a pyrolytic decomposition of the feed stock and wherein the reaction will take place in a reaction area. Where the feed stock is methane gas, it will be transported through the plasma torch in a temperature controlled feed or lead-in tube so that it will reach a temperature lower than 1000° C., preferably between 650° C. and 700° C. when it leaves the lead-in tube. The feed stock will undergo a first uniform heating in an area in the immediate vicinity of the plasma flame. Preferably, the feed stock is fed in centrally in relation to the flame. In an area immediately behind the plasma flame there will occur a mixing of a hydrocarbon material and the plasma gas, the temperature being increased to over 1600° C. which is the decomposition temperature for the raw material. Free hydrogen and dehydrogenated carbon material in the form of drops of liquid are formed in this area. The material formed thereby is passed to one or more subsequent stages where the temperature is kept between 1200° C. and 1600° C. The final and complete decomposition of the hydrocarbons to carbon black and hydrogen is performed at this point. Further raw materials may be added in this area which will cause quenching and react with the already produced carbon black thereby effecting an increase in the particle size, density and quantity produced without any further energy supplied. Thereafter, the products created are discharged and separated and the hot gas may be transported in a return pipe to the torch in order to further increase the energy yield. The temperatures in the reaction area are controlled by adjusting the feed rates for the reactant and plasma gas and/or by regulating the energy supplied to the plasma torch. Also, by adjusting the pressure in the reaction area an energy increase may be effected. The quality of the carbon black created can be controlled to achieve the desired quality much more easily than in the prior art processes by manipulation of the foregoing variables. The carbon in the form of a specially defined material with regard to particle size, structure, surface, specific weight, degree of acidity, electrical conductivity, reactivity, etc., can be varied in order to obtain special properties for the creation of special products within the metallurgical industry such as for reduction material, anode material, carburization material or lining material. The carbon may have a surface area (BET) of 5–30 m²/g, a dibutyl phthalate absorption (DBP) of 30–200 ml/100 g and a specific electrical resistance of less than 0.1 ohmcm and a reactivity less than 1000 ml/SiO for use a reduction material, a carbon black can be obtained for uses in anode material such as for aluminum production with a BET value of less than 5 m²/g, a DBP value of less than 30 ml/100 g, a specific weight compressed to 1.5–1.7 g/cm³ and a specific electrical resistance of less than 0.1 ohmcm. As a carburizing material for the steel industry, the carbon black can be adjusted to have a BET of between 5 and 30 m²/g and DBP of between 30 and 200 ml/100 g, a specific electrical resistance of less than 0.1 ohmcm and a hydrogen content less than 200 ppm.

We claim:

1. A carbon black material produced from a feedstock of one of natural gas and methane and made by a method including the steps of:

preheating the feedstock and passing the preheated feedstock through a feed tube which is temperature controlled so that the feedstock has a temperature between 650° C. and 700° C. and in a first stage, delivering the feedstock from the feed tube through a plasma torch having a plasma flame into a reaction area with the torch being fueled with recycled hydrogen to cause a pyrolytic decomposition of the feedstock by first heating the feedstock uniformly in the immediate vicinity of the plasma flame with mixing of the feedstock and the plasma gas occurring behind the plasma flame to raise the temperature of the feedstock to about 1600° C. to achieve decomposition of the feedstock and forming free hydrogen and drops of liquid of dehydrogenated carbon material;

passing at least the dehydrogenated carbon material to a second stage and maintaining the temperature of the carbon material between 1200° C. and 1600° C. to perform the complete decomposition of the feedstock to carbon black and hydrogen;

adding additional raw material in the second stage to cause quenching and reaction with the already formed carbon black to thereby increase the particle size, density and quantity of carbon black produced without an additional consumption of energy, and thereafter, discharging the formed carbon black and separating the carbon black from any gases derived in the process, said carbon black material having a surface area of less than 5 m²/g, a dibutyl phthalate absorption of less than 30 ml/100 g and density compressed to 1.5–1.7 g/cm³ and a specific electrical resistance of less than 0.1 ohmcm for use as an anode material for aluminum production.

2. The carbon black material as claimed in claim 1 wherein the temperature in the first stage reaction area is controlled by adjusting the feed rate of the feedstock.

3. The carbon black material as claimed in claim 1 wherein the temperature in the first stage reaction area is controlled by adjusting the feed rate of the plasma gas.

4. The carbon black material as claimed in claim 1 wherein the temperature in the first stage reaction area is controlled by regulating the energy supply to the plasma torch.

* * * * *